(12) United States Patent
Heinrichs

(10) Patent No.: US 9,540,219 B2
(45) Date of Patent: Jan. 10, 2017

(54) HOIST

(75) Inventor: Albrecht Heinrichs, Erkelenz (DE)

(73) Assignee: MHWIRTH GMBH, Erkelenz (DE)

( * ) Notice: Subject to any disclaimer, the term of this patent is extended or adjusted under 35 U.S.C. 154(b) by 135 days.

(21) Appl. No.: 14/234,632

(22) PCT Filed: Jul. 12, 2012

(86) PCT No.: PCT/EP2012/063684
§ 371 (c)(1),
(2), (4) Date: Jan. 24, 2014

(87) PCT Pub. No.: WO2013/013991
PCT Pub. Date: Jan. 31, 2013

(65) Prior Publication Data
US 2014/0166952 A1  Jun. 19, 2014

(30) Foreign Application Priority Data
Jul. 27, 2011  (DE) .................... 10 2011 052 183

(51) Int. Cl.
*B66D 1/34* (2006.01)
*F16G 11/00* (2006.01)

(52) U.S. Cl.
CPC *B66D 1/34* (2013.01); *F16G 11/00* (2013.01)

(58) Field of Classification Search
CPC .............. B66D 1/34; F16G 11/00; F16G 11/05
See application file for complete search history.

(56) References Cited

U.S. PATENT DOCUMENTS

| 1,461,052 | A | * | 7/1923 | Simpson | B66D 1/34 242/587.1 |
| 1,533,556 | A | * | 4/1925 | Howard | B66D 1/34 242/587.1 |
| 1,555,544 | A | * | 9/1925 | Anthony | B66D 1/34 242/587.1 |
| 2,053,976 | A | * | 9/1936 | Stahl | B62D 43/045 242/602.2 |

(Continued)

FOREIGN PATENT DOCUMENTS

| CN | 201896047 U | 7/2011 |
| DE | 687 945 C | 2/1940 |

(Continued)

*Primary Examiner* — Emmanuel M Marcelo
*Assistant Examiner* — Justin Stefanon
(74) *Attorney, Agent, or Firm* — Norman B. Thot

(57) ABSTRACT

A hoist includes a cable configured to lower and to raise a load, and a drum arranged to be rotatably seated about an axis of rotation and configured to wind up and to unwind the cable. The drum comprises a flanged wheel which comprises a securing device configured to secure the cable. The securing device comprises a cable-accommodating block comprising an abutment surface, and a cable clamp. The cable-accommodating block is affixed to the flanged wheel in a direction of tension of the cable and is configured to have the cable be passed there-through. The cable clamp comprises a counterpart abutment surface. The cable clamp is configured to be affixed to the cable. The abutment surface of the cable-accommodating block is configured to be contacted with the counterpart abutment surface of the cable clamp under an effect of a tensile force.

18 Claims, 7 Drawing Sheets

(56) References Cited

U.S. PATENT DOCUMENTS

| | | | | |
|---|---|---|---|---|
| 2,193,407 | A * | 3/1940 | Hagen | F16G 11/04 24/132 R |
| 2,357,733 | A | 9/1944 | Guderian | |
| 2,571,341 | A * | 10/1951 | Cordrey | B66D 1/34 242/125.1 |
| 2,892,598 | A * | 6/1959 | Dudley | B66D 1/36 242/586.1 |
| 2,965,944 | A * | 12/1960 | Moran | B64D 17/52 24/115 R |
| 3,577,605 | A * | 5/1971 | Fischer | F16G 11/00 24/114.5 |
| 4,078,277 | A * | 3/1978 | McCracken | F16G 11/00 174/45 R |
| 5,312,061 | A * | 5/1994 | McCormick | B65H 75/28 242/586.2 |
| 5,779,226 | A * | 7/1998 | Wudtke | B63B 21/16 114/293 |
| 7,108,248 | B2 * | 9/2006 | Winter | B66D 1/34 242/579 |
| 7,716,800 | B1 | 5/2010 | Percheron et al. | |
| 2003/0085391 | A1 | 5/2003 | Noske | |
| 2003/0111653 | A1 | 6/2003 | Heinrichs et al. | |
| 2004/0040123 | A1 * | 3/2004 | Tillitski | F16G 11/00 24/136 L |
| 2005/0002733 | A1 * | 1/2005 | Paulshus | B63B 21/502 403/305 |
| 2005/0103921 | A1 | 5/2005 | Winter et al. | |
| 2008/0282640 | A1 * | 11/2008 | Mathews | F16G 11/00 52/711 |
| 2011/0297778 | A1 * | 12/2011 | Meillet | B66D 1/34 242/376 |

FOREIGN PATENT DOCUMENTS

| | | |
|---|---|---|
| DE | 27 50 496 A1 | 5/1979 |
| DE | 101 54 968 A1 | 5/2003 |
| DE | 699 03 561 T2 | 7/2003 |
| DE | 103 50 942 B3 | 6/2005 |
| JP | 52-171077 U | 12/1977 |
| JP | 64-29387 U | 2/1989 |
| JP | 3-284600 A | 12/1991 |
| JP | 10-245194 A | 9/1998 |
| JP | 2002-60184 A | 2/2002 |
| WO | WO 01/64573 A2 | 9/2001 |

\* cited by examiner

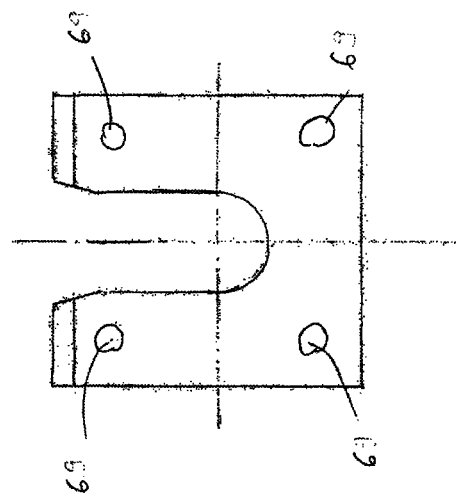
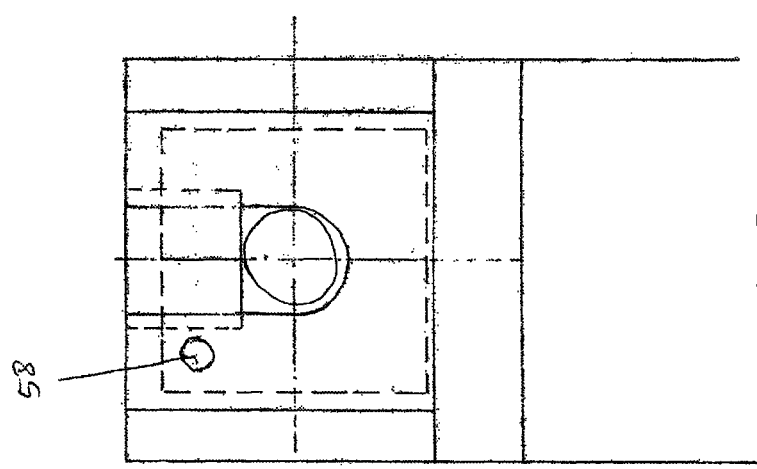
Fig. 6
Fig. 5

US 9,540,219 B2

HOIST

CROSS REFERENCE TO PRIOR APPLICATIONS

This application is a U.S. National Phase application under 35 U.S.C. §371 of International Application No. PCT/EP2012/063684, filed on Jul. 12, 2012 and which claims benefit to German Patent Application No. 10 2011 052 183.6, filed on Jul. 27, 2011. The International Application was published in German on Jan. 31, 2013 as WO 2013/013991 A1 under PCT Article 21(2).

FIELD

The present invention relates to a hoist with a cable for lowering and raising a load, in particular a drilling means, with a drum mounted in a rotatable manner about an axis of rotation for winding up and unwinding the cable, which comprises at least one flanged wheel on which a device is provided for securing the cable.

BACKGROUND

Such hoists, as they are described, for example, in WO 01/64573 A2, serve to lower and raise a load, in particular a drilling means, for example, of a platform into a drill hole or on the seafloor with a cable. One end of the cable is attached to the drilling means in the case of a simple reeving. In a multiple reeving configuration, the load is raised and lowered by means of a pulley system. The drilling means is then attached to the lowerable and raisable block of the pulley. One end of the cable is attached to a dead line anchor. In both cases, the respective other end of the cable is attached to a device for securing the cable which is provided on the exterior side of the flanged wheel. By means of a through-hole in the flanged wheel, the cable is guided to the drum and is (depending to what extent the drilling means is raised or lowered) more or less wound up thereon.

The cable is subject to considerable wear due to the substantial loads to which it is exposed during operation through the regular raising and lowering procedures under high speeds with the resulting associated acceleration forces. Since a cable break would result in unforeseeable consequences, the cable must be replaced or taken up (shortened) so that not yet abraded sections are exposed to loads.

Known hoists therefore require the cable-securing device located on the flanged wheel to be opened, for which operating personnel must work on the flanged wheel of the drum. This is, however, associated with substantial difficulties for modern hoists where other hoist components, such as brakes or gear housings, are arranged in close proximity to the flanged wheels, since personnel must work in the small space available.

SUMMARY

An aspect of the present invention is to provide an improved hoist.

In an embodiment, the present invention provides a hoist which includes a cable configured to lower and to raise a load, and a drum arranged to be rotatably seated about an axis of rotation and configured to wind up and to unwind the cable. The drum comprises a flanged wheel which comprises a securing device configured to secure the cable. The securing device comprises a cable-accommodating block comprising an abutment surface, and a cable clamp. The cable-accommodating block is affixed to the flanged wheel in a direction of tension of the cable and is configured to have the cable be passed there-through. The cable clamp comprises a counterpart abutment surface. The cable clamp is configured to be affixed to the cable. The abutment surface of the cable-accommodating block is configured to be contacted with the counterpart abutment surface of the cable clamp under an effect of a tensile force.

BRIEF DESCRIPTION OF THE DRAWINGS

The present invention is described in greater detail below on the basis of embodiments and of the drawings in which:

FIG. 5 shows view V in FIG. 4;

FIG. 6 shows view VI in FIG. 4;

DETAILED DESCRIPTION

Figure 1:
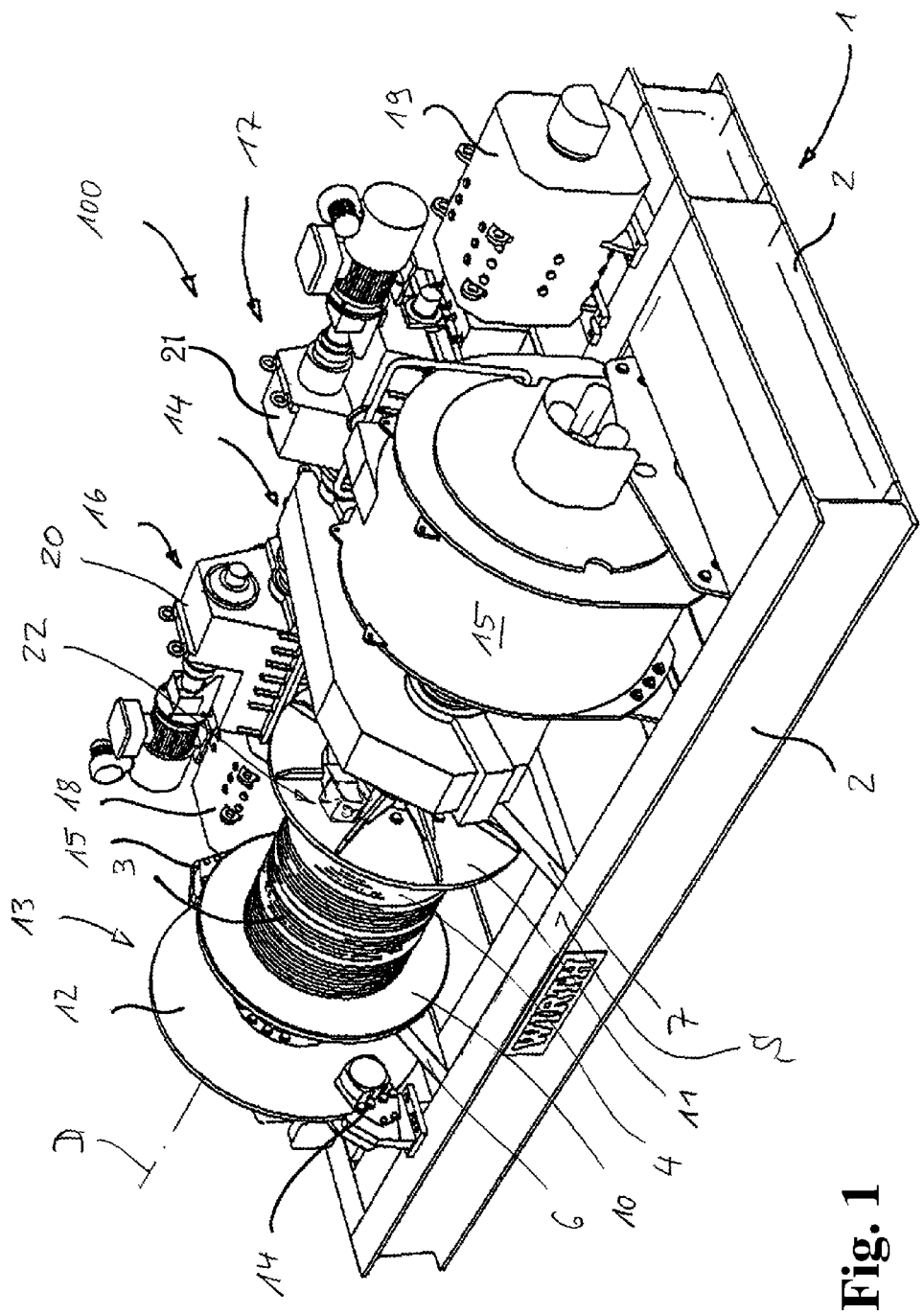
FIG. 1 shows an embodiment of the hoist in a perspective view from diagonally above without an installation device.

In the hoist, the cable-securing device comprises a cable-accommodating block which is secured on the flanged wheel in the direction of tension of the cable, through which the cable is loosely guided to the drum. The cable-securing device further comprises a cable clamp that can be secured on the cable in the direction of tension. The cable-accommodating block has an abutment surface to which the cable clamp can be brought into contact with a counterpart abutment surface under the action of tensile force. In other words, the cable-accommodating block forms a stopper for the cable clamp in the direction of tension of the cable. In the opposite direction, however, the cable can, after loosening a locking pin, be removed from the cable-accommodating block without manipulations being required on the cable clamp if it has been completely unwound from the drum.

The installation or removal of the cable clamp can thereby take place outside the hoist, where generally more space exists, than within the hoist itself, thereby enabling the measures required for the installation or removal of the cable clamp to be performed in a simpler and more reliable manner.

In an embodiment of the present invention, the cable clamp can, for example, consist essentially of a conical clamping set, i.e., of an arrangement that comprises an interior cone ring surrounding the cable, the ring interacting with an exterior cone ring so that the interior cone ring can be connected with the cable in a force-locking manner.

In order to prevent the unintentional loosening of the force-locking connection between the interior cone ring and the cable, the cone surfaces of the interior and exterior cone rings can, for example, be constructed to be self-locking. The interior cone ring may additionally be textured. It may, for example, have transverse grooves or a threading structure. No additional measures are necessarily required to obtain a one-time effected clamp fit of the interior cone ring on the cable.

Interior and exterior cone rings may be constructed in a known manner to effect a reduction of the interior diameter of the interior cone ring during the clamping procedure. In an embodiment of the present invention, the interior cone ring can, for example, be constructed in a multi-piece manner, for example, in a three-piece manner, with three segments parallel to the direction of tension of the cable and separated from each other.

The interior cone ring can, for example, be arranged so that the cone surfaces converge toward the load so that the tensile load acting on the cable has an effect in regard to improving the clamp fit.

In an embodiment of the present invention, an enhancement of the hoist comprising an installation device is provided, in which the cable clamp can, for example, be installed outside of the cable-accommodating block on the cable and can be secured in the direction of tension of the cable. The presence of such an installation device has the advantage that the cable and the cable clamp, if applicable, do not need to be held manually by using holding tools, but only need to be moved to the location defined by the installation device.

In an embodiment of the present invention, the installation device can, for example, comprise a support surface on which the cable surface can be supported in the direction of tension of the cable. This prevents the cable from being displaced out of the installation device under the effect of its own weight and, if applicable, by additional weights originating from attached means. The cable clamp can also be constructed so that the force introduced via the support surface into the side clamp increases the frictional connection between the interior cone ring and the cable.

The cable clamp can also be designed so that the clamp fit results solely through the tension-induced support of the cable clamp on the support surface. In an embodiment of the present invention, a clamping device can, for example, be provided on the installation device, by means of which the interior and exterior cone rings can be brought into an active connection with a pre-definable force. One can thereby execute specifically pre-calculable or previously determined frictional connections of the interior cone ring with the cable.

The clamping device may comprise at least one pressing device therefor, by means of which the interior cone ring can be pressed in the direction of tension of the cable into the exterior cone ring. In an embodiment of the present invention, hydraulic, mechanical, and/or electric actuating means can, for example, be used therefor.

The present invention is hereafter explained with reference to the attached drawings.

The embodiment, which is of a hoist and referred to in its entirety by 100 in the drawing, comprises a frame 1 having a rectangular layout that consists of a carrier 32 which in the shown embodiment is made of double-T steel girders which are welded together.

To raise and lower a drilling means not depicted in the drawing, hoist 100 comprises a cable 3, which with the help of a drum 4 can be wound up and unwound optionally in both directions of rotation about axis of rotation D in a motor-drivable manner.

Drum 4 is attached in a rotatably fixed manner on a drum shaft 5. It is seated in bearing blocks 6, 7 that are arranged across from two flanged wheels 10, 11, which have a greater diameter than drum 4 and that form outer front faces.

The end of drum shaft 5 depicted in the drawing on the left side is attached in a rotatably fixed manner with disk 12 of a disk brake arrangement 13, which comprises two brake calipers 14, 15 (which are provided in the shown embodiment as a gear unit 14 and as an eddy current brake 15) offset 180° in the direction of axis of rotation D. By means of the disk brake arrangement 13, the rotational speed of drum 4 can be slowed during the unwinding procedure of cable 4 or also totally blocked.

Across from the other flanged wheel 11 depicted in FIG. 1 on the right side, drum shaft 5 is connected to the output side of the gear unit 14 and to the downstream eddy current brake 15. The latter also serves to slow the unwinding speed of drum 4. Its use is, however, preferred over the disk brake arrangement 13 since the application of the braking energy occurs in a wear-free manner and without noise pollution caused by mechanical intervention.

Beside the arrangement of disk brake arrangement 13, drum 4, and eddy current brake 15, two rotary drive devices 16, 17 are attached to frame 1 on both sides of gear unit 14. Each of the rotary drive devices 16, 17 comprises an electric motor 18, 19, each of whose output shafts is connected in a rotationally fixed manner with the input shaft of a gearbox 20, 21.

The two output shafts of the gear boxes 20, 21 are connected to drive unit 14, which are connected to drum shaft 5 via intermediate wheels. Gear arrangement 14 thus serves to transfer torques between the output shafts of gearboxes 20, 21 and drum shaft 5. When cable 3 is wound up on drum 4, the rotary drive devices 16, 17 drive drum shaft 5. The braking of drum 4 required when winding up cable 3 by drum 4 may also take place by means of electric motors 18, 19 that then act as generators. In this way, the kinetic energy of the rotating drum can be transformed into electrical energy and fed back in.

Figure 2:
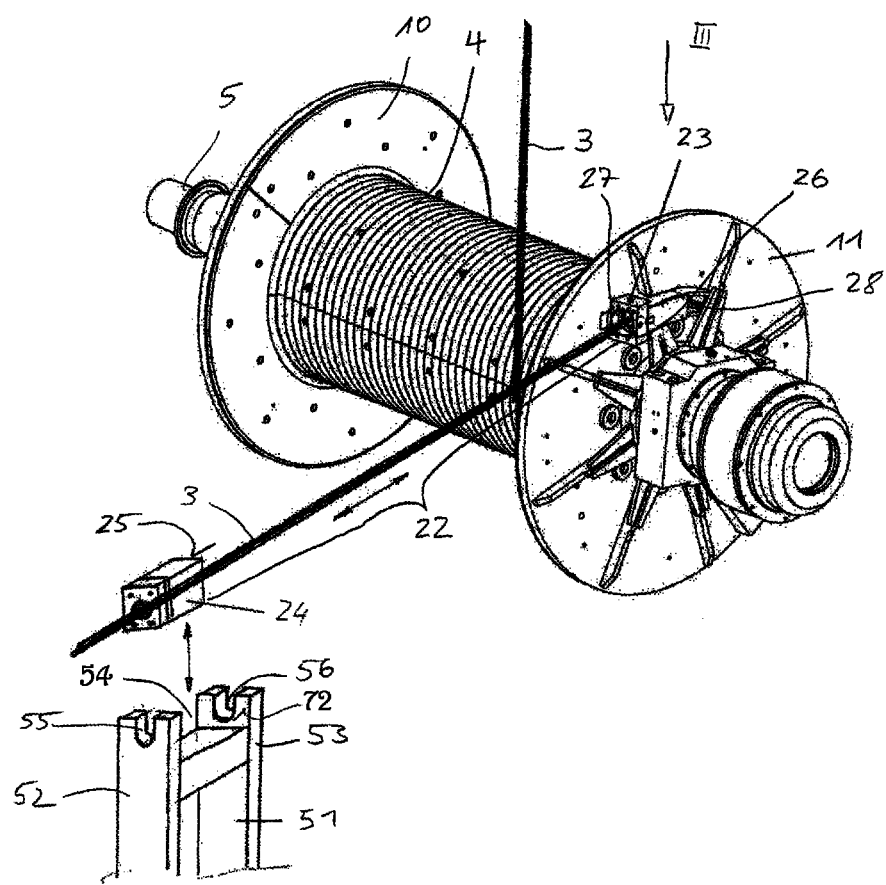
FIG. 2 shows the drum of the hoist as well as the mounting device not visible in FIG. 1 in a perspective, exploded-view.

A securing device 22 provided on flanged wheel 11 depicted in the drawing on the right side serves to attach cable 3 to drum 4. The securing device 22 comprises a cable-accommodating block 23 fixed on the flanged wheel 11 in the direction of tension of the cable, wherein cable 3 is guided through said block (see FIG. 2). Securing device 22 further comprises a cable clamp 24, which can be secured on cable 3 in the direction of tension and whose construction and functioning is described further below. It comprises a counterpart abutment surface 25 that, under the effect of the tensile force, contacts the facing abutment surface 26 of cable-accommodating block 23.

Cable-accommodating block 23 has a through-hole 27 that opens into an opening 28 in flanged wheel 11, through which cable 3 is guided from the exterior side of flanged wheel 11 depicted in the right side of the drawing to the interior side of drum 4.

Figure 3:
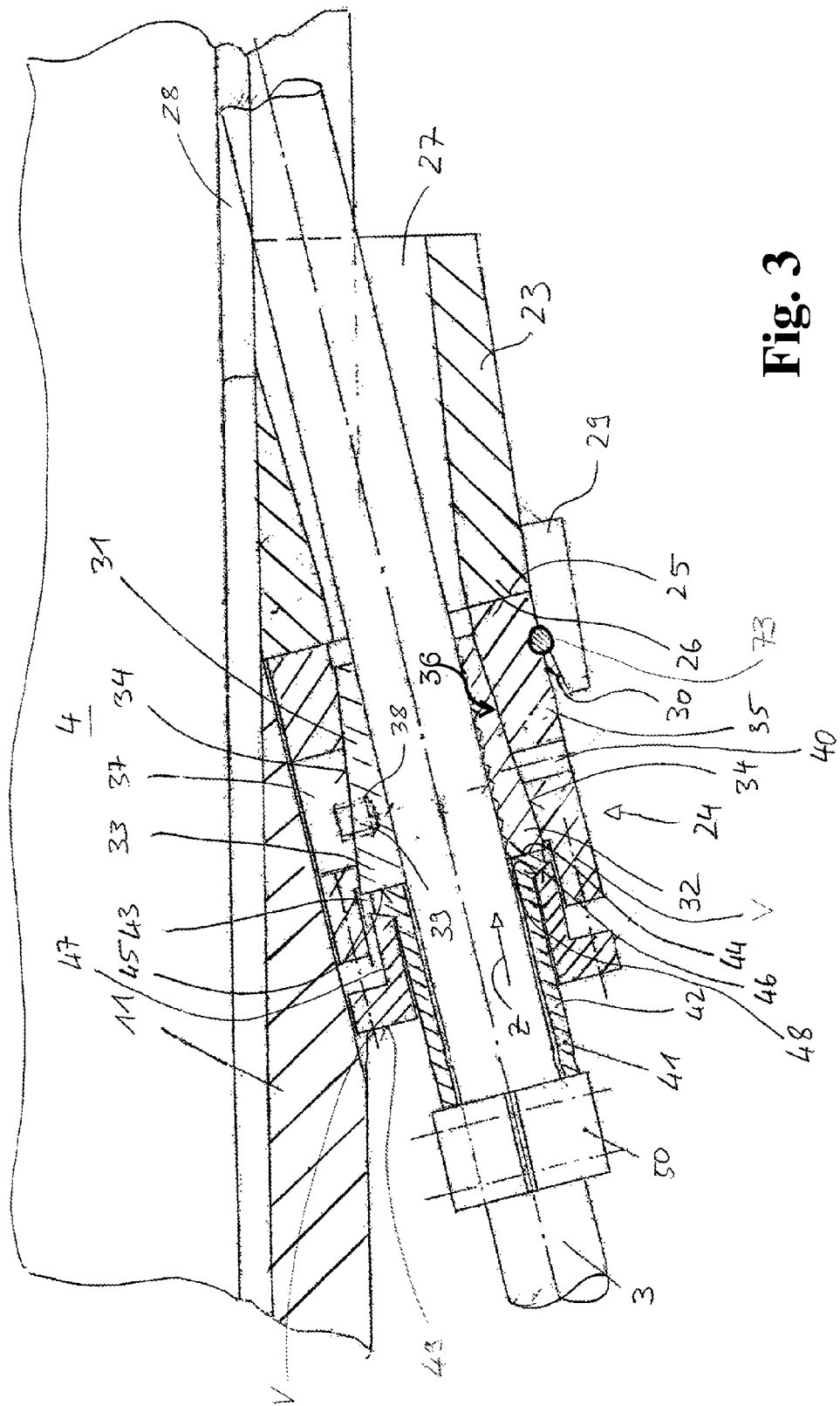
FIG. 3 shows a cutaway diagram of the cable-accommodating block with a cable clamp and attached cable (partially sectioned) in a view according to FIG. 2 from above (view III in FIG. 2), wherein, however, the cable clamp is located in the cable-accommodating block of the flanged wheel.

As one can see in FIG. 3, which depicts cable clamp 24 in a clamped stated with its counterpart abutment surface 25 on abutment surface 26 of cable-accommodating block 23, a guide attachment 29 is provided on cable-accommodating block 23, the guide attachment 29 protruding over abutment surface 26 toward the cable clamp 24 and having a region 30 that expands at a slant. It serves to simplify the positioning of the cable clamp 24 and its security through locking pin 73.

Cable clamp 24 is constructed as a type of conical clamping set, which in a clamped state with the cable 3 effects a force-locking connection. To this end, cable clamp 24 comprises an interior cone ring 31 surrounding cable 3, the interior core ring 31 being subdivided in the direction of tension Z of the cable 3 in three approximately 120-degree segments of which only two segments 32, 33 are visible in the drawing. The segments 32, 33 have cone surfaces 34 that converge in the direction of the load.

Interior cone ring 31 is surrounded by an exterior cone ring 35, whose cone surface 36 is constructed complementary to cone surface 34 of the segments of interior cone ring 31.

The angles of cone surfaces 34, 36 are selected in such a manner that self-locking is obtained.

Exterior cone ring 35 has on a region of its circumference a radial opening 37 that has an oblong shape in its cross-section. Through the radial opening 37, a clamping pin 39 is pressed into a blind hole 38 in segment 33 of interior cone ring 31. In a completely built-in state, it projects (as can be seen in FIG. 3) into the radial opening 37 and thus effects an anti-twist protection between the interior cone ring 31 and exterior cone ring 35.

On the side opposite of radial opening 37, a threaded hole 40 is incorporated in the exterior cone ring 35. It serves to optionally attach a means (not depicted in the drawings) for connecting with a lifting gear, such as an eye-bolt.

Cable clamp 24 also comprises a thrust bushing 41, which with a flange 43 projecting radially over a cylindrical part 42 abuts its front face 44 on front face 45 of the interior cone ring 31 facing it.

Front face 48 of a retaining ring 47 contacts flange surface 46, sloping away outwardly opposite front face 44, of thrust bushing 41. On its end opposite flange surface 46, retaining ring 47 also has a flange 49. The flange 49 serves to effect a screw connection V indicated simply by means of a dotted-dashed line in FIG. 3, by means of which retaining ring 47 is pulled in the direction of the exterior cone ring 35, to thereby secure the cone clamp fit of interior cone 31 in exterior cone ring 35 against undesired loosening.

The end of cable clamp 24 is formed by a two-part clamping piece 50 provided on the exterior end region of thrust bushing 41, the clamping piece 50 being constructed to simplify installation in direction of tension Z. The two parts of clamping piece 50 are screwed together, wherein the screw connections are depicted only in a dotted-dashed line manner.

The hoist 100 comprises an installation device 51, which can be provided in the region of position S on frame 1 optionally or permanently. Installation device 51 comprises a receiving space 54 constructed between two supports 52, 53 for cable clamp 24. To this end, in the upper regions of supports 52, 53, there are provided recesses 55, 56 opening upward in which cable 3 can be laid (see FIG. 2). The upper region of support 53 forms a contact surface for cable clamp 24.

In a first embodiment of installation device 51, support 52, which is connected to support 53 by means of a solid bridge 57 and points away from drum 4 in the operating position, is provided with one or more, for example, four threaded holes 58 for forming a pressing device P in the upper region. One or more pressure screws 59 are screwed into the holes 58 and their ends projecting into receiving space 54 press against external front face 60 of retaining ring 47. By tightening pressure screw 59, one can effect the tensioning of the segments of interior cone ring 31 with exterior cone ring 35, and thus effect the force-locking of the cable clamp with cable 3, whereby cable clamp 24 is supported on support surface 72.

Figure 7:
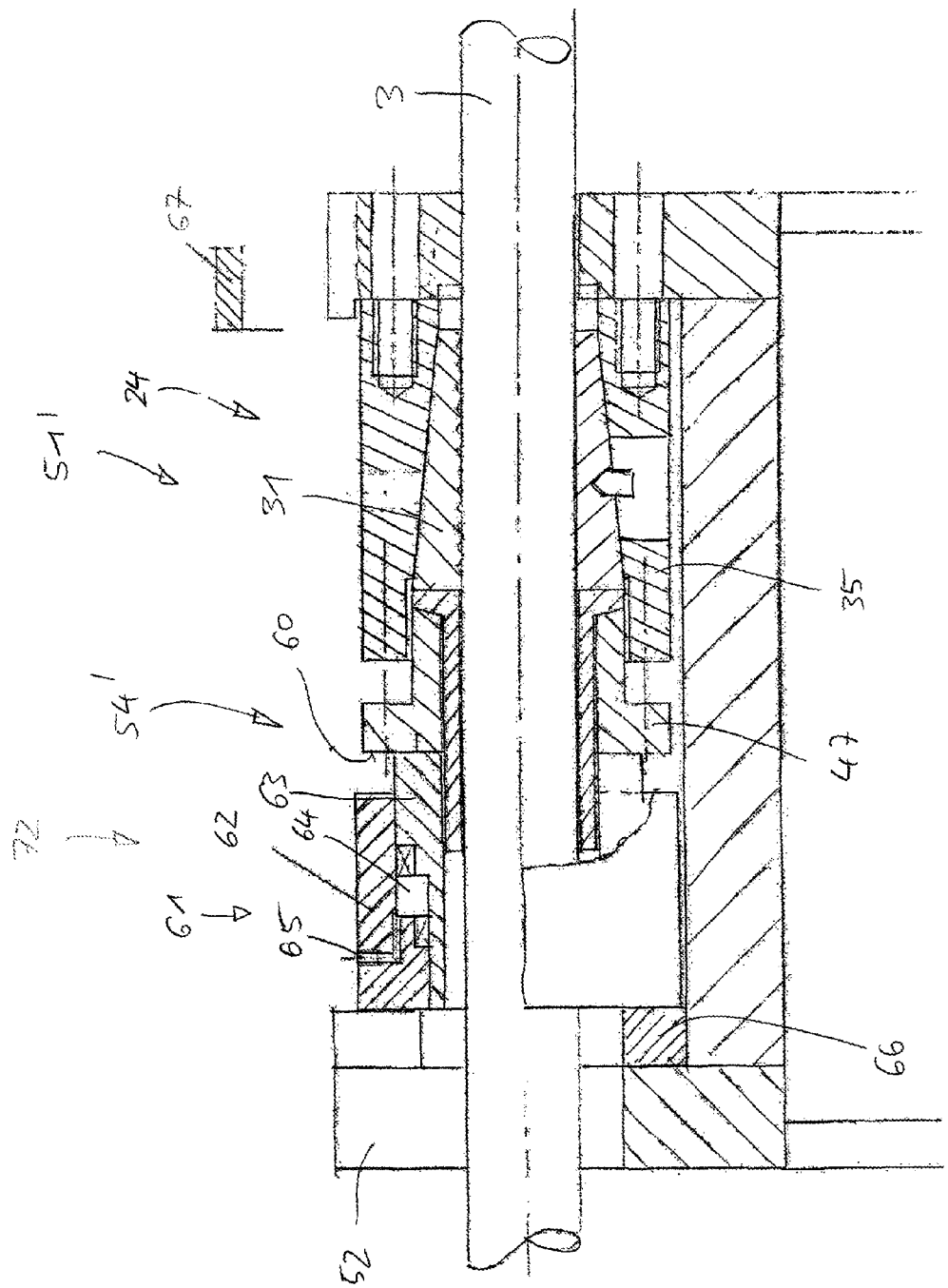
FIG. 7 shows a diagram of the cable clamp in the mounting device during the clamping process in a diagram corresponding to FIG. 4, with a hydraulically acting clamping device.

Another embodiment of the installation device, which is referred to as 51', is depicted in FIG. 7. Instead of pressure screws 59 that are screwed into threaded holes 58, there is now, for forming pressing device P, in receiving space 54' a hydraulically actuated pressure device 61, which has an external cylinder section 62 and a piston section 63 displaceable in relation to it in direction of tension Z. Between cylinder section 62 and piston section 63, there is constructed a ring-shaped cylinder space 64, into which opens a hydraulic line 65, via which pressurized hydraulic fluid can be alternatively supplied or suctioned.

Both the cylinder section 62 as well as the piston section 63 are hollow-bored so that cable 3 can be guided therethrough. Cylinder section 62 abuts support 52' via thrust piece 66; piston section 63 abuts the exterior front face 60 of retaining ring 47.

As is evident from FIG. 7, by applying pressurized hydraulic medium to hydraulic line 65, interior cone ring 31 can be pressed into exterior cone ring 35 and thus the force-locking connection between cable clamp 24 and cable 3 can be effected, whereby in turn cable clamp 24 is supported by support surface 72.

Figure 4:
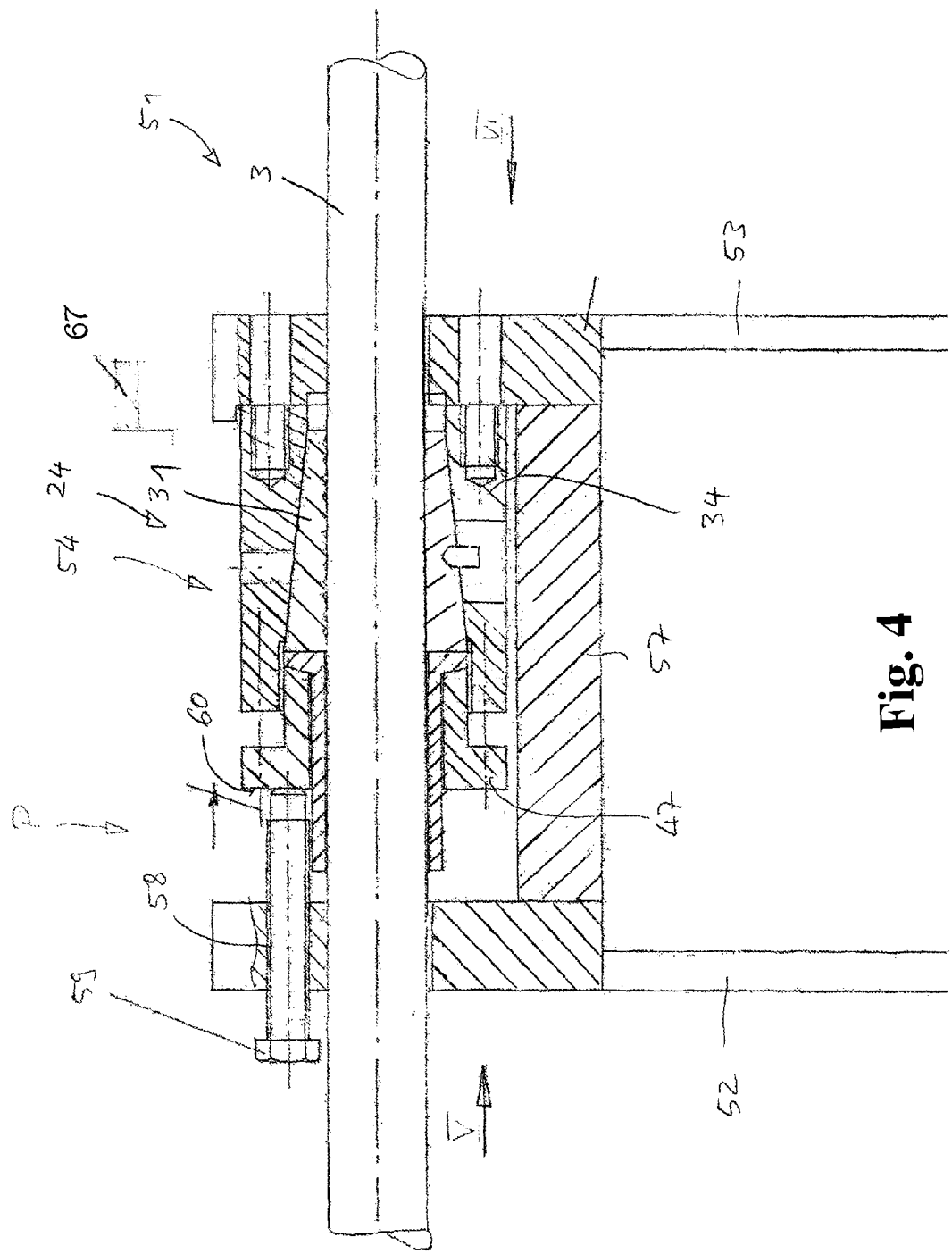
FIG. 4 shows in a partially sectioned manner the cable clamp in the state inserted in the installation device during clamping with the help of a mechanically acting clamping device.
Figure 8:
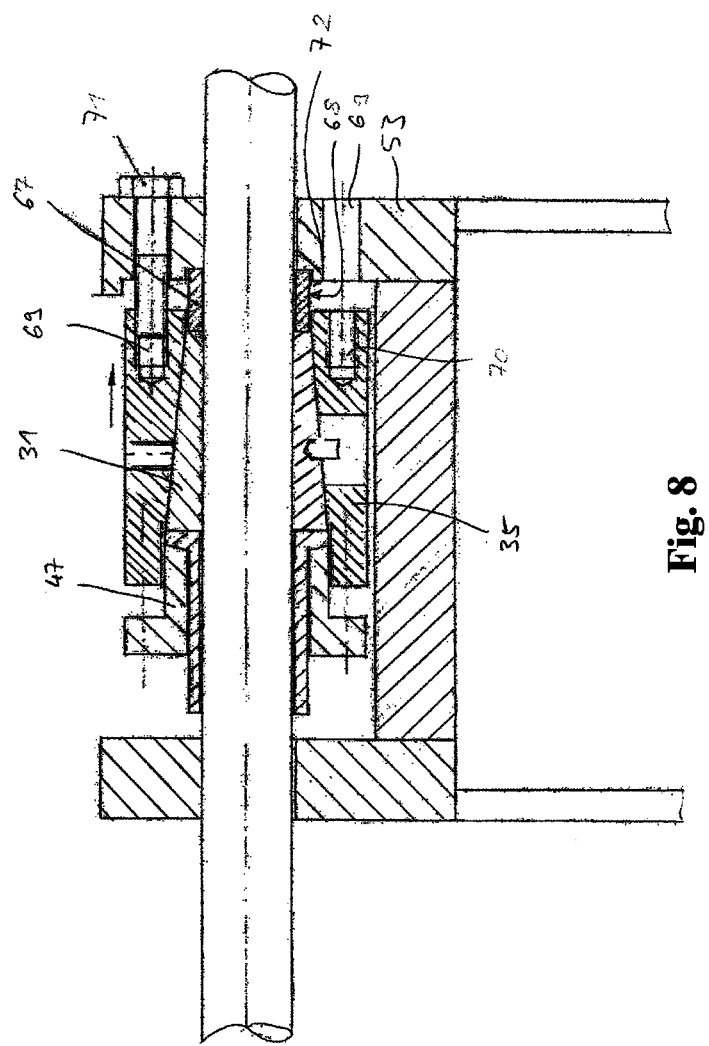
FIG. 8 shows a cable clamp housed in the installation device during the loosening procedure.

To loosen the cable clamp, a two-part release ring 67, indicated only at the top in FIGS. 4 and 7, is provided which after being pulled back from support surface 72 can be inserted into a ring space 68 between support surface 72 and interior cone ring 31. By means of the holes 69 provided in support 53 (see also FIG. 6), releasing screws 71, of which only one is depicted in FIG. 8, can be screwed into threaded holes 70 of exterior cone ring 35 so that said ring can be removed from interior cone ring 31 by tightening releasing screws 71, since said interior cone ring is supported on support 53 via releasing ring 67.

It is clear that prior to the releasing procedure, retaining screws that fix the retaining ring 47 in relation to exterior cone ring 35 must be at least loosened or removed.

The present invention is not limited to embodiments described herein; reference should be had to the appended claims.

LIST OF REFERENCE SIGNS

100 Hoist
1 Frame
2 Carrier
3 Cable
4 Drum
5 Drum shaft
6 Bearing block
7 Bearing block
10 Flanged wheel
11 Flanged wheel
12 Disk
13 Disk brake arrangement
14 Gear unit
15 Eddy current brake
16 Rotating drive device
17 Rotating drive device
18 Electric motor
19 Electric motor
20 Gearbox
21 Gearbox
22 Securing device
23 Cable-accommodating block
24 Cable clamp
25 Counterpart abutment surface
26 Abutment surface 27 Through-hole
28 Opening
29 Guide attachment
30 Region
31 Interior cone ring
32 Segment
33 Segment
34 Cone surface
35 Exterior cone ring
36 Cone surface
37 Radial opening
38 Blind hole
39 Clamping pin
40 Threaded hole
41 Thrust bushing
42 Cylindrical part
43 Flange
44 Front face
45 Front face
46 Flange surface
47 Retaining ring
48 Front face
49 Flange
50 Clamping piece
51 Installation device
52 Support
53 Support
54 Receiving space
55 Recess
56 Recess
57 Bridge
58 Threaded hole
59 Pressure screw
60 Exterior front face
61 Pressure device
62 Cylinder section
63 Piston section
64 Cylinder space
65 Hydraulic line
66 Thrust piece
67 Release ring
68 Ring space
69 Hole
70 Threaded hole
71 Releasing screws
72 Support surfaces
73 Locking pin
D Axis of rotation
P Pressing device
S Position
V Screw connection
Z Direction of tension

What is claimed is:

1. A hoist comprising:
a cable configured to lower and to raise a load;
a drum arranged to be rotatably seated about an axis of rotation and configured to wind up and to unwind the cable, the drum comprising a flanged wheel which comprises a securing device configured to secure the cable, the securing device comprising:
a cable-accommodating block comprising an abutment surface, the cable-accommodating block being affixed to the flanged wheel in a direction of tension of the cable and being configured to have the cable be passed there-through, and
a cable clamp comprising a counterpart abutment surface, the cable clamp being configured to be affixed to the cable,
wherein,
the abutment surface of the cable-accommodating block is configured to be contacted with the counterpart abutment surface of the cable clamp under an effect of a tensile force; and
an installation device configured to install and secure the cable clamp to the cable therein outside of the cable-accommodation block, the installation device comprising a support structure comprising:
a receiving space for the cable clamp,
a support surface configured to have the counterpart abutment surface of the cable clamp abut thereon, and
a recess configured to have the cable be arranged therein,
wherein,
the installation device is arranged so that the installation device does not rotate with the drum, and
when the cable clamp is in the receiving space and the cable is in the recess, the counterpart abutment surface of the cable clamp abuts the support surface in a plane which is perpendicular the direction of tension of the cable.

2. The hoist as recited in claim 1, further comprising an exterior cone ring, wherein the cable clamp further comprises an interior cone ring, the interior cone ring being configured to surround the cable and to be connectable to the exterior cone ring so that the interior cone ring is connectable with the cable in a force-locking manner in the direction of tension of the cable.

3. The hoist as recited in claim 2, wherein the interior cone ring comprises an interior cone ring cone surface, and the exterior cone ring comprises an exterior cone ring cone surface, the interior cone ring cone surface and the exterior cone ring cone surface each being configured so as to be self-locking.

4. The hoist as recited in claim 2, wherein the interior cone ring further comprises segments which are separated from each other and which are substantially parallel to the direction of tension of the cable.

5. The hoist as recited in claim 3, wherein the interior cone ring is arranged so that the interior cone ring cone surface converges toward the load.

6. The hoist as recited in claim 1, wherein the installation device comprises a support surface configured to have the cable clamp be supported thereon in the direction of tension of the cable.

7. The hoist as recited in claim 6, wherein the installation device further comprises a pressure device configured to bring the interior cone ring and the exterior cone ring into a work connection.

8. The hoist as recited in claim 7, wherein the pressure device comprises at least one pressing device configured to press the interior cone ring into the exterior cone ring in the direction of tension of the cable.

9. The hoist as recited in claim 8, wherein the at least one pressing device comprises an actuating device which is at least one of hydraulic, mechanical, and electrical.

10. The hoist as recited in claim 1, wherein the load is a drilling device.

11. A hoist comprising:
a cable configured to lower and to raise a load;
a drum arranged to be rotatably seated about an axis of rotation and configured to wind up and to unwind the cable, the drum comprising a flanged wheel which comprises a securing device configured to secure the cable, the securing device comprising:

a cable-accommodating block comprising an abutment surface, the cable-accommodating block being affixed to the flanged wheel in a direction of tension of the cable and being configured to have the cable be passed there-through, and a cable clamp configured to be affixed to the cable, the cable clamp comprising a counterpart abutment surface, an exterior cone ring comprising an exterior cone ring surface, and an interior cone ring, the interior cone ring comprising, an interior cone ring cone surface, the interior cone ring being arranged so that the interior cone ring cone surface converges toward the load, and a plurality of segments which are arranged separate from each other substantially parallel to the direction of tension of the cable, the interior cone ring being configured to surround the cable and to be connectable to the exterior cone ring so that the interior cone ring is connectable with the cable in a force-locking manner in the direction of tension of the cable, wherein, the interior cone ring is surrounded by the exterior cone ring, the plurality of segments of the interior cone ring are arranged to comprise a segment cone surface, the exterior cone ring surface is constructed complementary to the segment cone surface, and the abutment surface of the cable-accommodating block is configured to be contacted with the counterpart abutment surface of the cable clamp under an effect of a tensile force.

12. The hoist as recited in claim 11, wherein the exterior cone ring comprises an exterior cone ring cone surface, and the interior cone ring cone surface and the exterior cone ring cone surface are each configured so as to be self-locking.

13. The hoist as recited in claim 11, further comprising an installation device configured to install and secure the cable clamp to the cable therein outside of the cable-accommodation block.

14. The hoist as recited in claim 13, wherein the installation device comprises a support surface configured to have the cable clamp be supported thereon in the direction of tension of the cable.

15. The hoist as recited in claim 14, wherein the installation device further comprises a pressure device configured to bring the interior cone ring and the exterior cone ring into a work connection.

16. The hoist as recited in claim 15, wherein the pressure device comprises at least one pressing device configured to press the interior cone ring into the exterior cone ring in the direction of tension of the cable.

17. The hoist as recited in claim 16, wherein the at least one pressing device comprises an actuating device which is at least one of hydraulic, mechanical, and electrical.

18. The hoist as recited in claim 11, wherein the load is a drilling device.

\* \* \* \* \*